United States Patent
Yagi et al.

(10) Patent No.: US 9,102,783 B2
(45) Date of Patent: Aug. 11, 2015

(54) STRIPPABLE COATING COMPOSITION FOR FLOORS

(75) Inventors: Konosuke Yagi, Hadano (JP); Satoshi Kaneda, Hadano (JP); Tetsuya Umehara, Hadano (JP); Shimon Nishida, Hadano (JP); Tamotsu Nagamatsu, Kuki (JP); Tatsumi Kosaka, Kuki (JP)

(73) Assignees: RINREI WAX CO., LTD., Tokyo (JP); ADEKA CORPORATION, Tokyo (JP)

( * ) Notice: Subject to any disclaimer, the term of this patent is extended or adjusted under 35 U.S.C. 154(b) by 352 days.

(21) Appl. No.: 13/497,977

(22) PCT Filed: Sep. 15, 2010

(86) PCT No.: PCT/JP2010/065906
§ 371 (c)(1), (2), (4) Date: Jun. 6, 2012

(87) PCT Pub. No.: WO2011/037052
PCT Pub. Date: Mar. 31, 2011

(65) Prior Publication Data
US 2012/0252958 A1    Oct. 4, 2012

(30) Foreign Application Priority Data

Sep. 25, 2009   (JP) ................. 2009-219961

(51) Int. Cl.

| | |
|---|---|
| *C08G 18/08* | (2006.01) |
| *C08G 18/65* | (2006.01) |
| *C08G 18/42* | (2006.01) |
| *C08G 18/66* | (2006.01) |
| *C08G 18/12* | (2006.01) |
| *C08G 18/32* | (2006.01) |
| *C08G 18/36* | (2006.01) |
| *C08G 18/75* | (2006.01) |
| *C09D 5/20* | (2006.01) |
| *C09D 175/06* | (2006.01) |
| *E04F 15/12* | (2006.01) |

(52) U.S. Cl.
CPC ........ *C08G 18/6505* (2013.01); *C08G 18/0823* (2013.01); *C08G 18/12* (2013.01); *C08G 18/3212* (2013.01); *C08G 18/36* (2013.01); *C08G 18/4211* (2013.01); *C08G 18/4216* (2013.01); *C08G 18/4238* (2013.01); *C08G 18/6644* (2013.01); *C08G 18/6662* (2013.01); *C08G 18/755* (2013.01); *C09D 5/20* (2013.01); *C09D 175/06* (2013.01); *E04F 15/12* (2013.01)

(58) Field of Classification Search
CPC ........... C08G 18/3212; C08G 18/6505; C08G 18/6644; C08G 18/6662; C08G 18/4202; C08G 18/4211; C08G 18/4238
USPC ................. 524/507, 589, 590, 591, 839, 840
See application file for complete search history.

(56) References Cited

U.S. PATENT DOCUMENTS

| | | | |
|---|---|---|---|
| 3,467,610 A | 9/1969 | Fiarman et al. | |
| 4,277,380 A * | 7/1981 | Williams et al. | 524/591 |
| 4,507,431 A * | 3/1985 | Stutz et al. | 524/840 |
| 5,851,618 A | 12/1998 | Liddell et al. | |
| 6,620,511 B1 * | 9/2003 | Wigger et al. | 428/413 |

FOREIGN PATENT DOCUMENTS

| | | |
|---|---|---|
| GB | 1082153 A | 9/1967 |
| JP | 44-24407 B | 10/1969 |
| JP | 49-1458 B | 1/1974 |
| JP | 11-199802 A | 7/1999 |
| JP | 2001-149854 A | 6/2001 |
| JP | 2002-336759 A | 11/2002 |
| JP | 2004-231823 A | 8/2004 |
| JP | 2006-160867 A | 6/2006 |
| JP | 2009-120684 A | 6/2009 |
| JP | 2009-167237 A | 7/2009 |
| WO | WO 2011/037052 A1 | 3/2011 |

OTHER PUBLICATIONS

International Search Report dated Oct. 26, 2010, for International Application No. PCT/JP2010/065906.
Soap Cosmetics Chemical Specialties, vol. 61, No. 9, Sep. 1985, p. 85-86.

* cited by examiner

*Primary Examiner* — Michael L Leonard
(74) *Attorney, Agent, or Firm* — Birch, Stewart, Kolasch & Birch, LLP

(57) ABSTRACT

A strippable coating composition for floors which contains at least 50% by weight of an aqueous polyurethane resin relative to the total solid content, wherein the hydroxyl-containing compound component constituting the aqueous polyurethane resin comprises (A) a polyester polyol component prepared from 1,6-hexanediol and either an aliphatic dibasic acid and/or an aromatic dibasic acid, (B) a low-molecular alicyclic diol component, and (C) an unsaturated fatty acid ester polyol. The strippable coating composition can form a coating film that has a tear strength of 0.3N or more, a break strength of 10 MPa or more, and an elongation at break of 50% or more.

13 Claims, No Drawings

STRIPPABLE COATING COMPOSITION FOR FLOORS

TECHNICAL FIELD

This invention relates to a strippable coating composition for floors. More specifically, the invention relates to an aqueous strippable coating composition for floors, which forms a coating film having durability capable of maintaining the aesthetic appearance of the floor for a long period of time, and being easily strippable from the floor without using a release agent.

BACKGROUND ART

In maintaining the aesthetic appearance of a floor, it is common practice to coat the floor with a lustering agent, thereby protecting the floor. Lustering agents consisting mainly of wax which are defined in the Japanese Industrial Standards "JIS K3920", such as an oily floor polish, an emulsifiable floor polish, and a wax type aqueous floor polish, were predominant in the past. However, such wax-based lustering agents were disadvantageous, for example, because they required polishing work after coating, and they were inferior in aspects of durability such as persistence of gloss and the degree of dirt adhesion.

To deal with these disadvantages, Patent Documents 1, 2 and Non-Patent Document 1, for example, have proposed emulsions of metal-crosslinked acrylic copolymers, polyethylene wax emulsions, and polymer type aqueous floor polishes comprising alkali-soluble resins and plasticizers (hereinafter referred to as "resin waxes").

With such resin waxes, polishing work after coating is unnecessary, and the aspects of durability such as persistence of gloss and the degree of dirt adhesion can be improved in comparison with the above wax-based lustering agents. With the passage of time, however, gloss declines, and dirt and black heel marks (black marks of a shoe sole shaved off) become conspicuous.

With a coating of the resin wax, therefore, if its deterioration is marked, it has been necessary to swell the coating with a solvent component, and cut the metal-crosslinked portion of the acrylic resin into pieces by an alkali component, with the use of a release agent comprising a glycol-based solvent or a glycol ether-based solvent, a chelating agent, an amine, an inorganic alkali, a wetting agent, etc., remove all the pieces from the floor surface by use of a polisher, and then newly coat the resin wax, thereby repairing the floor coating.

Such repair work requires a lot of time. If the coating film deposited is thick, in particular, it has been difficult to remove the coating film completely at a time, and a plurality of repair operations have been required. Moreover, a waste liquor of the used release agent has so high values of BOD, COD, n-hexane extracts, and total nitrogen that the waste liquor cannot be discarded as such. The waste liquor needs to be post-treated in order to lighten burden on the environment. Thus, very complicated operations have been needed, and costs have been burdensome.

In recent years, proposals have been made for silicone-based inorganic coating agents as described in Patent Document 3, etc., and ultraviolet curable coating agents as described in Patent Document 4, etc., which have even higher durability while further suppressing tiny scars or dirt. Such coating agents, however, have posed problems such that deep scars enter the resulting coating over time, making repair difficult, and that stripping work cannot be done easily. Thus, the widespread use of the coating agents has not been made.

Patent Document 5, for example, proposes a strippable coating composition for floors which can form a film-like coating on a floor surface. With such a strippable coating composition for floors, the coating can be peeled off the floor surface as a single film. Thus, it can be easily removed without the use of a release agent, and the efficiency of removal work can be increased.

The strippable coating composition for floors described in Patent Document 5, etc., however, is of a two-part coating type which involves coating of a liquid for forming a strippable layer exhibiting peel performance relative to the floor surface, followed by coating of a liquid for forming a stainproof layer for preventing dirt, stain or the like. Thus, the strippable coating composition for floors has posed the problem of requiring much time and labor for its application.

To solve the problem of the above two-part coating type, Patent Document 6 to be indicated below proposes a one-part coating type strippable coating composition for floors which has a material dispersed in water, the material adapted to form a coating film essentially consisting of a urethane resin with specified film properties such as break strength and elongation at break.

However, the above-mentioned one-part coating type coating composition tends to be poor in drying characteristics or dryness. Furthermore, the coating composition has involved the following problems: When an end of the coating film applied to the floor surface is turned up with a cutter or the like and peeled, the film may be trapped, for example, by a scar in the floor surface or the joint of the tile, and tear may occur. In this case, the tear caused to the coating film may spread in the stripping direction, so that the coating film becomes difficult to peel as a single continuous film. As a result, an end of the coating film remaining intact on the floor surface has to be turned up again using a cutter or the like, and peeled anew. Thus, the stripping work efficiency lowers.

To solve the above problems, Patent Document 7 to be indicated below proposes a coating composition providing a film for which tearing force is further specified. This coating composition has been improved in decreased work efficiency, but has still been unsatisfactory in the property of preventing dirt adhesion or anti-dirt adhesion (black heel mark resistance) as well as in water resistance.

CITATION LIST

Patent Literature

Patent Literature 1: JP-B-44-024407
Patent Literature 2: JP-B-49-001458
Patent Literature 3: JP-A-2001-149854
Patent Literature 4: JP-A-2002-336759
Patent Literature 5: JP-A-11-199802
Patent Literature 6: JP-A-2004-231823
Patent Literature 7: JP-A-2009-167237

Non Patent Literature

Non patent Literature 1: Cosmetic Chemical Specialties, 61(9), 86 (1985)

SUMMARY OF INVENTION

Technical Problem

The present invention has been accomplished in the light of the above-mentioned problems. It is an object of the present invention to provide a strippable coating composition for floors, which is excellent in stripping work efficiency (properties of being strippable and difficult of tear spread (strippability and tear spreadability)), prevention of dirt adhesion (anti-dirt adhesion; black heel mark resistance), water resistance, and dryness of the resulting coating film.

Solution to Problem

In an attempt to solve the aforementioned problems, the inventors of the present application have conducted in-depth studies, and have found that these problems can be solved by a strippable coating composition for floors which contains a specific aqueous polyurethane resin and forms a coating film having specific physical properties. These findings have led them to accomplish the present invention.

The strippable coating composition for floors concerned with the present invention is a strippable coating composition for floors which contains 50% by weight or more of an aqueous polyurethane resin relative to a total solid content and forms a coating film, wherein a hydroxyl-containing compound component constituting the aqueous polyurethane resin comprises (A) a polyester polyol component prepared from 1,6-hexanediol and at least one of an aliphatic dibasic acid and an aromatic dibasic acid, (B) a low-molecular alicyclic diol component, and (C) an unsaturated fatty acid ester polyol component, and the coating film has a tear strength of 0.3N or more, a break strength of 10 MPa or more, and an elongation at break of 50% or more.

It is preferred for the hydroxyl-containing compound component to contain the component (A) at a molar ratio of 0.3 to 0.8, the component (B) at a molar ratio of 0.05 to 0.45, and the component (C) at a molar ratio of 0.05 to 0.35 (provided that the total molar ratio of these three components is 1).

It is preferred that the component (B) be at least one member selected from the group consisting of 1,4-cyclohexanediol, hydrogenated bisphenol A, tricyclodecanedimethylol, 1,3-cyclohexanedimethanol, and 1,4-cyclohexanedimethanol.

It is preferred that the component (C) be an ester compound of a drying oil fatty acid or a semi-drying oil fatty acid with at least one polyol selected from the group consisting of trimethylolpropane, glycerin, and pentaerythritol.

It is preferred that the fatty acid constituting the component (C) be at least one member selected from the group consisting of fatty acids of linseed oil, fatty acids of dehydrated castor oil, fatty acids of safflower oil, fatty acids of soybean oil, linolenic acid, linoleic acid, and oleic acid.

It is preferred that the component (C) be an ester compound composed of a dehydrated castor oil fatty acid and trimethylolpropane.

It is preferred that the component (C) be a monoester compound formed from an unsaturated fatty acid compound and a polyol compound at a 1:1 molar ratio.

It is preferred for the aforementioned strippable coating composition for floors to contain an acrylic resin.

On this occasion, the acrylic resin is preferably contained in an amount of 1 to 20% by weight relative to the total solid content.

On the other hand, it is preferred that an acrylic-urethane copolymer resin be contained in the above strippable coating composition for floors.

On this occasion, the acrylate-urethane copolymer resin is preferably contained in a proportion of 1 to 40% by weight relative to the total solid content.

It is further preferred that a release improver be contained in the above strippable coating composition for floors.

Advantageous Effects of Invention

According to the strippable coating composition for floors concerned with the present invention, even if the coating film applied to the floor surface is trapped, for example, by a scar in the floor surface or the joint of the tile, and tear occurs when the end of the coating film is turned up with a cutter or the like and peeled, the tear caused to the coating film can be inhibited from spreading in the stripping direction. The coating film can be peeled, unchanged, as a single continuous film. Thus, a decrease in stripping work efficiency (strippability and tear spreadability)) can be prevented, and sufficient anti-dirt adhesion (black heel mark resistance), water resistance, and dryness can also be obtained.

DESCRIPTION OF EMBODIMENTS

Embodiments of the strippable coating composition for floors according to the present invention will now be described, but the present invention is in no way limited to the embodiments described below.

In the present invention, it is important that a strippable coating composition for floors, which can exhibit the following characteristics, can be provided:

(1) Can be coated by a roller, a mop, a brush, or a troweling brush, and can be coated thick.

(2) After a coating film is formed, can be further coated on top of it to increase the film thickness.

(3) Can be coated even on a sealer (acrylic resin-based one or the like) used for a floor covering material with a large amount of suction.

(4) Forms a coating film having moderate adhesion which ensures that the coating film is not easily strippable by the walking of a person on the floor covering material.

(5) Forms a coating film which is excellent in durability and minimally wears upon long-term walking of a person.

(6) Forms a coating film having moderate water resistance.

(7) Forms a coating film which, even if scars or stains become conspicuous over time, does not have high adhesion and, even if scars or tile joints exert influence, can be manually stripped as a single continuous film.

The strippable coating composition for floors concerned with the present invention, which is designed to be capable of exhibiting the above-mentioned characteristics, is a strippable coating composition for floors which contains 50% by weight or more of an aqueous polyurethane resin relative to the total solid content and which forms the above coating film, wherein a hydroxyl-containing compound component constituting the aqueous polyurethane resin comprises (A) a polyester polyol component prepared from 1,6-hexanediol and at least one of an aliphatic dibasic acid and an aromatic dibasic acid, (B) a low-molecular alicyclic diol component, and (C) an unsaturated fatty acid ester polyol component, and the coating film has a tear strength of 0.3N or more, a break strength of 10 MPa or more, and an elongation at break of 50% or more.

The above component (A) is a hydroxyl-terminated ester compound obtained by the dehydration condensation reaction of 1,6-hexanediol and at least one of an aliphatic dibasic acid and an aromatic dibasic acid. This polyester polyol does not have a restricted number average molecular weight, but from the viewpoint of the effects of the present invention, its number average molecular weight is preferably 500 to 5000, and more preferably 1000 to 3000.

Examples of the aliphatic dibasic acid constituting the component (A) are saturated aliphatic dicarboxylic acids (for example, oxalic acid, malonic acid, succinic acid, glutaric acid, adipic acid, pimelic acid, suberic acid, azelaic acid, sebacic acid, undecanedioic acid, dodecanedioic acid, tridecanedioic acid, and tetradecanedioic acid), saturated alicyclic dicarboxylic acids (for example, cyclopentane dicarboxylic acid, hexahydrophthalic acid, and methylhexahydrophthalic acid), unsaturated aliphatic dicarboxylic acids (for example, maleic acid, fumaric acid, itaconic acid, citraconic acid, and mesaconic acid), and unsaturated alicyclic dicarboxylic acids (for example, tetrahydrophthalic acid, methyltetrahydrophthalic acid, nadic acid (endomethylenetetrahydrophthalic acid), methylnadic acid, methylbutenyltetrahydrophthalic acid, and methylpentenyltetrahydrophthalic acid). Of them, adipic acid and sebacic acid are preferred and, adipic acid, in particular, is more preferred.

Examples of the aromatic dibasic acids constituting the component (A) are aromatic dicarboxylic acids (for example, phthalic acid, isophthalic acid, terephthalic acid, tolylenedicarboxylic acid, and xylylenedicarboxylic acid). Of them, isophthalic acid and terephthalic acid are preferred and, isophthalic acid, in particular, is more preferred.

As the component (B), alicyclic diols having 5 to 10 carbon atoms and their alkylene oxide (ethylene oxide, propylene oxide, etc.) adducts, for example, are named, although they are not limitative. More concretely, there are named, for example, cyclopentanediol, 1,4-cyclohexanediol, cycloheptanediol, cyclooctanediol, 1,3-cyclohexanedimethano-1,1,4-cyclohexanedimethanol, hydrogenated bisphenol A, tricyclodecanedimethylol, and alkylene oxide adducts of these diols. Of them, 1,4-cyclohexanediol, hydrogenated bisphenol A, tricyclodecanedimethylol, 1,3-cyclohexanedimethanol, and 1,4-cyclohexanedimethanol are preferred. Particularly, 1,3-cyclohexanedimethanol and 1,4-cyclohexanedimethanol are more preferred.

If the alkylene oxide adduct of the alicyclic diol in the component (B) has a high molecular weight, it tends to diminish the effects of the present invention (water resistance, etc.). Thus, its number average molecular weight is preferably less than 500.

The component (C) is an ester compound of an unsaturated fatty acid with a polyol. The unsaturated fatty acid constituting the component (C) is not restricted, but is preferably a monocarboxylic acid compound or the like. This is because a fatty acid with a valence of 2 or more results in the formation of an ester polyol having a high molecular weight, which tends to lower work efficiency and the effects of the present invention. Examples of the monocarboxylic acid compound are unsaturated fatty acids (for example, drying oil fatty acids, semi-drying oil fatty acids, linolenic acid, linoleic acid, and oleic acid).

The drying oil fatty acids and the semi-drying oil fatty acids mentioned above are fatty acids obtained by the saponification decomposition or the like of drying oils or semi-drying oils. Examples of the drying oils are linseed oil, poppy oil, tung oil, safflower oil, walnut oil, sunflower oil, soybean oil, and dehydrated castor oil. Examples of the semi-drying oils are sesame oil, corn oil, rapeseed oil, and cottonseed oil. Of the above unsaturated fatty acids, fatty acids of linseed oil, fatty acids of dehydrated castor oil, fatty acids of safflower oil, fatty acids of soybean oil, linolenic acid, linoleic acid, and oleic acid are preferred. From the viewpoint of the effects of the present invention, dehydrated castor oil fatty acids, in particular, are more preferred.

The polyol constituting the component (C) is not restricted, but is preferably a compound having two or more hydroxyl groups. Examples of such a compound are aliphatic diols (for example, ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol), alicyclic diols (for example, cyclohexanedimethanol, and cyclohexanediol), polyols having three or more hydroxyl groups (for example, trimethylolethane, trimethylolpropane, hexitols, pentitols, glycerin, polyglycerin, pentaerythritol, dipentaerythritol, and tetramethylolpropane). Of them, trimethylolpropane, glycerin and pentaerythritol are preferred. Particularly, from the viewpoint of the effects of the present invention, trimethylolpropane is more preferred.

The component (C) is preferably a monoester compound formed from the unsaturated fatty acid and the polyol at a molar ratio of 1:1.

That is, particularly from the viewpoint of the effects of the present invention, the component (C) is more preferably an ester polyol composed of the dehydrated castor oil fatty acid and trimethylolpropane, and is even more preferably a monoester compound formed from them at a molar ratio of 1:1.

The reasons why the component (C) in which the polyol has 3 or more hydroxyl groups and which is a monoester compound formed from the above unsaturated fatty acid and the above polyol at a molar ratio of 1:1 is particularly preferred will be described below.

As described above, the unsaturated fatty acid preferably used in the present invention is a monocarboxylic acid. Thus, an unsaturated fatty acid ester compound formed from a dihydric polyol and a monocarboxylic acid at a molar ratio of 1:1 is a monool having one hydroxyl group. Thus, a chain extension reaction does not proceed in the reaction for forming a polyurethane resin. For this reason, for example, such an unsaturated fatty acid ester compound tends to lower the mechanical properties of the urethane resin film or reduce the effects of the present invention.

The unsaturated fatty acid ester compound formed from a trihydric or higher-hydric polyol and a monocarboxylic acid at a molar ratio of 1:1, on the other hand, is a polyol having two or more hydroxyl groups. Thus, it becomes possible in the polyurethane resin formation reaction to form a polyurethane resin having a chain extended or crosslinked structure.

If the number of moles of the unsaturated fatty acid is larger than the number of moles of the polyol, the resulting unsaturated fatty acid ester compound has less than two hydroxyl groups, even when the number of hydroxyl groups of the polyol is two or three. Thus, for the same reason as the above, the chain extension reaction of a urethane prepolymer difficultly proceeds in the polyurethane resin formation reaction, thus resulting in tendencies toward declines in the mechanical properties of the urethane resin film or in the effects of the present invention.

For the reasons mentioned above, it is particularly preferred that the polyol has three or more hydroxyl groups and the product is a monoester compound formed from the unsaturated fatty acid and the polyol. In this case, the effects of the present invention can be easily exhibited.

A method for producing the aqueous polyurethane resin according to the present invention is not restricted, but various publicly known methods can be applied. An example is a method which comprises reacting the polyol component and an isocyanate component in a solvent inert to the reaction and having high affinity for water to synthesize a urethane prepolymer, then dispersing the urethane prepolymer in water and, if desired, converting the urethane prepolymer into a high molecular compound with the use of a chain extender.

The aqueous polyurethane resin can also be prepared, for example, by a self-emulsification method in which a urethane prepolymer having an anionic hydrophilic group such as a carboxyl group or a sulfonic group, or a cationic hydrophilic group such as a tertiary amine is dispersed using a neutralizing agent; a forced emulsification method using an emulsifying agent; or a combined emulsification method as a combination of these emulsification methods.

Examples of the solvent are acetone, methyl ethyl ketone, dioxane, tetrahydrofuran, and N-methyl-2-pyrrolidone. Any of these solvents is usually used in an amount of 3 to 100% by weight based on the total amount of the materials used for the production of the urethane prepolymer. If the boiling point of the solvent is 100° C. or lower, it is preferred that the solvent be distilled off under reduced pressure after the aqueous polyurethane resin is synthesized.

The aqueous polyurethane resin essentially requires the three polyol components consisting of the aforementioned components (A) to (C). In addition to these polyol components, the aqueous polyurethane resin can contain other polyol component.

Examples of the other polyol mentioned above are polyester polyols other than the component (A) and the component (C), low-molecular polyols other than the component (B), polyether polyols, polycarbonate polyols, polybutadiene polyols, and silicone polyols.

Examples of the polyester polyols other than the component (A) and the component (C) are those which are obtained by direct esterification reaction, or by ester exchange reaction, between low-molecular polyols including the component (B), and polyvalent carboxylic acids (or polycarboxylic acids) or their ester-forming derivatives (esters, anhydrides, halides, etc.), lactones or hydroxycarboxylic acids obtained by their hydrolytic ring opening, whose amounts are less than the stoichiometric amounts of the low-molecular polyols.

Examples of the low-molecular polyols including the component (B) are polyols similar to those named as the polyols constituting the component (C).

Examples of the polyvalent carboxylic acids are aliphatic dicarboxylic acids (for example, oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acids, and dimer acids), aromatic dicarboxylic acids (for example, phthalic acid, terephthalic acid, isophthalic acid, and naphthalenedicarboxylic acids), alicyclic dicarboxylic acids (for example, cyclohexanedicarboxylic acids), tricarboxylic acids (for example, trimellitic acid, trimesic acid, and trimers of castor oil fatty acids), and tetracarboxylic acids (for example, pyromellitic acid).

Examples of the ester-forming derivatives of the polyvalent carboxylic acids are acid anhydrides or halides of the above polyvalent carboxylic acids (for example, chlorides and bromides), and lower aliphatic esters of the polyvalent carboxylic acids (for example, methyl esters, ethyl esters, propyl esters, isopropyl esters, butyl esters, isobutyl esters, and amyl esters).

Examples of the lactones are γ-caprolactone, δ-caprolactone, ε-caprolactone, dimethyl-ε-caprolactone, δ-valerolactone, γ-valerolactone, and γ-butyrolactone.

The isocyanate component used in the aqueous polyurethane resin is not restricted, but isocyanate compounds in wide use, such as bifunctional (di)isocyanate compounds or polyisocyanate compounds having three or more functional groups, are used.

Examples of the bifunctional (di)isocyanates are aromatic diisocyanates (for example, 2,4-tolylene diisocyanate, 2,6-tolylene diisocyanate, diphenylmethane-4,4'-diisocyanate, p-phenylene diisocyanate, xylylene diisocyanate, 1,5-naphthylene diisocyanate, 3,3'-dimethyldiphenyl-4,4'-diisocyanate, dianisidine diisocyanate, and tetramethylxylylene diisocyanate), alicyclic diisocyanates (for example, isophorone diisocyanate, dicyclohexylmethane-4,4'-diisocyanate, trans-1,4-cyclohexyl diisocyanate, and norbornene diisocyanate), and aliphatic diisocyanates (for example, 1,6-hexamethylene diisocyanate, 2,2,4-trimethylhexamethylene diisocyanate, 2,4,4-trimethylhexamethylene diisocyanate, and lysine diisocyanate). Of them, the alicyclic diisocyanates are preferred and, from the viewpoint of the effects of the present invention, isophorone diisocyanate and dicyclohexylmethane-4,4'-diisocyanate are more preferred. Isophorone diisocyanate, in particular, is even more preferred, because it provides excellent strippability.

Examples of the polyisocyanates having three or more functional groups are isocyanurate trimers, biuret trimers or trimethylolpropane adducts of the above diisocyanates, and isocyanates having three or more functional groups, such as triphenylmethane triisocyanate, 1-methylbenzol-2,4,6-triisocyanate, and dimethyltriphenylmethane tetraisocyanate.

The above-mentioned bifunctional (di) isocyanates and the above polyisocyanate compounds having three or more functional groups can be used in the form of modification products, such as those by carbodiimide modification, isocyanurate modification, or biuret modification, or in the form of block isocyanates blocked by various blocking agents.

As the chain extender used in the aqueous polyurethane resin, one or more of diamine compounds, for example, can be used. Examples of the diamine compounds are low-molecular diamines obtained by substitution of alcoholic hydroxyl groups of the aliphatic diols or alicyclic diols, named as the low-molecular polyols including the component (B), by amino groups (for example, ethylenediamine and propylenediamine), polyetherdiamines (for example, polyoxypropylenediamine and polyoxyethylenediamine), alicyclic diamines (for example, menthenediamine, isophoronediamine, norbornenediamine, bis(4-amino-3-methyldicyclohexyl)methane, diaminodicyclohexylmethane, bis(aminomethyl)cyclohexane, and 3,9-bis(3-aminopropyl)2,4,8,10-tetraoxaspiro(5,5) undecane), aromatic diamines (for example, m-xylenediamine, α-(m/p-aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, and α,α'-bis(4-aminophenyl)-p-diisopropylbenzene) hydrazine, and dicarboxylic acid dihydrazide compounds which are compounds of hydrazine with the dicarboxylic acids named as the aforementioned polyvalent carboxylic acids.

As compounds imparting a hydrophilic group to the urethane prepolymer for the aqueous polyurethane resin, there are named, for example, compounds which can impart an anionic group or a cationic group. Examples of the compound imparting an anionic group are polyols containing a carboxyl group (for example, dimethylolpropionic acid, dimethylolbutanoic acid, dimethylolbutyric acid, and dimethylolvaleric acid), and polyols containing a sulfonic group (for example, 1,4-butanediol-2-sulfonic acid). Examples of the compound imparting a cationic group are N,N-dialkylalkanolamines, N-alkyl-N,N-dialkanolamines (for example, N-methyl-N,N-diethanolamine, and N-butyl-N,N-diethanolamine), and trialkanolamines.

As the emulsifying agent used in producing the aqueous polyurethane resin by the forced emulsification method, there can be used a publicly known emulsifying agent which is commonly applied when producing an aqueous polyurethane resin. Examples of the emulsifying agent are anionic surface active agents, nonionic surface active agents, cationic surface active agents, ampholytic surface active agents, polymeric surface active agents, and reactive surface active agents.

As the neutralizing agent used for the aqueous polyurethane resin, neutralizing agents for an anionic group or a cationic group, for example, are named.

Examples of the neutralizing agent for an anionic group are tertiary amines (for example, trialkylamines (e.g., trimethylamine and triethylamine), N,N-dialkylalkanolamines, N-alkyl-N,N-dialkanolamines, and trialkanolamines), and basic compounds (for example, ammonia, sodium hydroxide, potassium hydroxide, and lithium hydroxide).

Examples of the neutralizing agent for a cationic group are organic carboxylic acids (for example, formic acid, acetic acid, lactic acid, succinic acid, glutaric acid, and citric acid), organic sulfonic acids (for example, p-toluenesulfonic acid and alkyl sulfonates), inorganic acids (for example, hydrochloric acid, phosphoric acid, nitric acid, and sulfonic acid), epoxy compounds (for example, epihalohydrin), and quaternizing agents (for example, dialkylsulfuric acids, and halogenated alkyls).

If the amount of the neutralizing agent used is too large or too small relative to 1 mol of the hydrophilic group, there may usually be a decline in the dispersibility of the urethane resin in water or the storage stability of the aqueous polyurethane resin. Thus, its amount is preferably 0.8 to 1.2 mols.

The components (A) to (C) are not restricted in their amounts incorporated. However, the equivalent ratio of the isocyanate groups to the total hydroxyl group equivalents (NCO/OH) of the components (A) to (C), the compound imparting the hydrophilic group, and the other polyol component used where necessary, in the urethane prepolymer before dispersion in water is preferably in the range of 1.05 to 3.5, and more preferably in the range of 1.2 to 2.5.

The reasons are as follows: If the above equivalent ratio (NCO/OH) is lower than 1.05, the urethane prepolymer becomes highly viscous as its molecular weight increases. As a result, the resulting polymer becomes minimally dispersible in water. If the equivalent ratio (NCO/OH) is higher than 3.5, there will be an increase in the remaining isocyanate groups. This may cause foaming due to reaction with water during dispersion in water, or deterioration of the coating film properties due to an increase in urea bonds.

There are no limitations on the proportions of the components (A) to (C). However, it is preferred to set the molar ratio of the component (A) at 0.3 to 0.8, that of the component (B) at 0.05 to 0.45, and that of the component (C) at 0.05 to 0.35 (provided that the total molar ratio of the three components is 1). From the point of view of being able to exhibit the effects of the present invention remarkably, and so on, it is more preferred to set the molar ratio of the component (A) at 0.4 to 0.7, that of the component (B) at 0.15 to 0.35, and that of the component (C) at 0.1 to 0.3 (provided that the total molar ratio of the three components is 1).

The solid content of the aqueous polyurethane resin is not restricted, and any value can selected. Preferably, the solid content is 1 to 65% by weight, because dispersibility and operability for obtaining a coating film or a shaped product are satisfactory. A more preferred solid content is 5 to 40% by weight.

A coating film formed from the above-described composition has a tear strength of 0.3N or more, a break strength of 10 MPa or more, and an elongation at break of 50% or more. Preferably, the coating film has a tear strength of 1N or more, a break strength of 15 MPa or more, and an elongation at break of 100% or more.

If the tear strength is less than 0.3N, the following problem occurs: When an end of the coating film applied to the floor surface is turned up with a cutter or the like and peeled, the film tears because of trapping by a scar in the floor surface or the joint of the tile. This tear spreads in the stripping direction, so that the film becomes difficult to peel as a single continuous film. Eventually, the object of the present invention cannot be attained.

If the break strength is less than 10 MPa, the coating film is easily breakable when stripped. Thus, its peeling as a single continuous film is too difficult to attain the object of the present invention.

If the elongation at break is less than 50%, the coating film becomes so hard and brittle to be easily breakable. Thus, it becomes difficult to peel as a single continuous film, making the object of the present invention unattainable. The elongation at break is preferably 300% or less, because a soft film involves frequent entrapment of dirt due to the walking or the like of a person (decline in black heel mark resistance).

Furthermore, the strippable coating composition for floors according to the present invention can enhance the anti-dirt adhesion of the coating film (black heel mark resistance). Thus, it is preferred to incorporate an emulsion of an acrylic resin or an acrylic-urethane copolymer resin into the coating composition.

Examples of the emulsion of the acrylic resin are those used for floor polish, such as "DURAPLUS 2 (trade name)", "DURAPLUS 3 (trade name)", "PRIMAL E2409 (trade name)", "PRIMAL B924 (trade name)", and "RHOPLEX 2133 (trade name)" produced by Rohm & Haas Japan, "AE116 (trade name)" produced by JSR Corporation, and "ACRYSET FB252E (trade name)" and "ACRYSET FB334E (trade name)" produced by NIPPON SHOKUBAI CO., LTD.

As the emulsion of the acrylic-urethane copolymer resin, there can be named, for example, "UC90 (trade name)" produced by Alberdingk Boley, Inc., "ADEKA BONTIGHTER HUX-401 (trade name)" produced by ADEKA Corporation, and "NeoPac E125 (trade name)" produced by DSM Corporate.

It is preferred for the acrylic resin to be contained in an amount of 1 to 20% by weight relative to the total solid content of the coating composition. The acrylic-urethane copolymer resin is contained preferably in an amount of 1 to 40% by weight, more preferably in an amount of 1 to 20% by weight, relative to the total solid content of the coating composition.

The reasons are as follows: If the content of the acrylic resin or the acrylic-urethane resin is less than 1% by weight, the effect of the combined use of the composition and the emulsion diminishes. If the content is more than the above value (20% by weight for the acrylic resin, 40% by weight for the acrylic-urethane copolymer resin), the coating film becomes hard and brittle, resulting in decreases in break strength and tear strength. As a result, the coating film is easily breakable when stripped. This is likely to exert adverse influence on the effects aimed at by the present invention.

Preferably, the strippable coating composition for floors according to the present invention further contains a release improver.

Examples of the release improver are fluorine compounds, waxes, silicone compounds, and alkyl phosphoric ester compounds which are used alone or as mixtures of a plurality of them in arbitrary proportions. They can be used in forms dissolved or dispersed in water, or in powdery forms.

The fluorine compounds are preferably those containing a fluoroalkyl group in the molecule. Concrete examples are perfluoroalkylphosphates (e.g., "Surflon S-111 (trade name)" produced by AGC SEIMI CHEMICAL CO., LTD.), perfluoroalkylphosphoric ester salts (e.g., "Surflon S-112 (trade name)" produced by AGC SEIMI CHEMICAL CO., LTD.), perfluoroalkylamine oxides (e.g., "Surflon S-141 (trade name)" produced by AGC SEIMI CHEMICAL CO., LTD.), and perfluoro-EO adducts (e.g., "Surflon S-145 (trade name)" produced by AGC SEIMI CHEMICAL CO., LTD.). The perfluoroalkylphosphates, in particular, are more preferred, because they can enhance stripping performance even when used in smaller amounts.

Examples of the waxes are vegetable waxes (e.g., candelilla wax, carnauba wax, rice wax, Japan wax, and Jojoba oil), animal waxes (e.g., beeswax, anhydrous lanolin, and spermaceti), mineral waxes (e.g., montan wax, ozokerite, and ceresin), petroleum waxes (e.g., paraffin wax, microcrystalline wax, and petrolatum), synthetic hydrocarbon waxes (e.g., Fischer-Tropsch wax, polyethylene oxide wax, polyethylene wax, polypropylene oxide wax, polypropylene wax, and acrylic-ethylene copolymer wax), modified waxes (e.g., montan wax derivative, paraffin wax derivative, and microcrystalline wax derivative), hydrogenated waxes (e.g., hydrogenated castor oil, and hydrogenated castor oil derivative), 12-hydroxystearic acid, stearic acid amide, anhydrous phthalic acid imide, bisamide, amides, glycerin esters, sorbitan esters, higher alcohols with 12 or more carbon atoms (preferably, 18 or more carbon atoms), and higher fatty acids with 12 or more carbon atoms (preferably, 18 or more carbon atoms). However, these are not limitative.

Examples of the silicone compounds are those having siloxane bonds as a main skeleton, for example, silicone oils (e.g., methylphenylpolysiloxane-based ones (e.g., "KF50 (trade name)" and "KF53 (trade name)" produced by Shin-Etsu Chemical Co., Ltd.), dimethylpolysiloxane-based ones (e.g., "KF96 (trade name)" and "KF99 (trade name)" produced by Shin-Etsu Chemical Co., Ltd.), cyclic dimethylpolysiloxane-based ones (e.g., "KF994 (trade name)", "KF995 (trade name)" and "KF9902 (trade name)" produced by Shin-Etsu Chemical Co., Ltd.), fluoropolysiloxane-based ones (e.g., "FL100 (trade name)" produced by Shin-Etsu Chemical Co., Ltd.), epoxy-modified ones (e.g., "KF101 (trade name)" produced by Shin-Etsu Chemical Co., Ltd.), polyether-modified ones (e.g., "KF351 (trade name)" produced by Shin-Etsu Chemical Co., Ltd.), alcohol-modified ones (e.g., "KF851 (trade name)" produced by Shin-Etsu Chemical Co., Ltd.), amino-modified ones (e.g., "KF857 (trade name)" produced by Shin-Etsu Chemical Co., Ltd.), and carboxyl-modified ones (e.g., "X22-3701 (trade name)" produced by Shin-Etsu Chemical Co., Ltd.)), silicone emulsions (e.g., dimethylpolysiloxane-based ones (e.g., "KM70 (trade name)", "KM71 (trade name)", "KM72 (trade name)", "KM75 (tradename)", "KM85 (tradename)", "KM722 (trade name)", "KM740 (trade name)", "KM753 (trade name)", "KM764 (trade name)", "KM765 (trade name)", "KM766 (trade name)", "KM780 (trade name)", "KM883 (trade name)", "KM885 (trade name)", and "KM901 (trade name)" produced by Shin-Etsu Chemical Co., Ltd.), polyether-modified ones (e.g., "KM244F (trade name)" produced by Shin-Etsu Chemical Co., Ltd.)), silicone powders (e.g., dimethylpolysiloxane-based ones (e.g., "F201 (tradename)", "F202 (tradename)" and "F250 (trade name)" produced by Dow Corning Toray Co., Ltd.), methylphenylpolysiloxane-based ones (e.g., "F300 (trade name)" produced by Dow Corning Toray Co., Ltd.), epoxy-modifiedones (e.g., "E601 (tradename)" produced by Dow Corning Toray Co., Ltd.)), and silicone water-soluble resins (e.g., polyether-modified ones (e.g., "SH3746 (trade name)", "SH3749 (trade name)" and "SH3771 (trade name)" produced by Dow Corning Toray Co., Ltd.)). However, these are not limitative.

Examples of the alkylphosphoric ester compounds are "Sepal #365 (trade name)", "Sepal #380 (trade name)", "Sepal #440 (trade name)", "Sepal #441 (trade name)", "Sepal #517 (trade name)" and "Sepal #521 (trade name)" produced by CHUKYO YUSHI CO., LTD. However, these are not limitative.

The use of such a release improver enables the strippability performance of the resulting coating film to be maintained for a long period. In particular, the fluorine compound, especially, the perfluoroalkylphosphoric acid ester salt, can exhibit the best effects, but it is costly. Thus, it is preferably used in combination with other type of release improver.

The release improver is used in an amount of 0.01 to 5.0% by weight (preferably 0.01 to 3.0% by weight) in the case of the fluorine compound, in an amount of 1 to 20% by weight (preferably 1 to 10% by weight) in the case of the wax, in an amount of 0.1 to 5% by weight (preferably 0.1 to 3% by weight) in the case of the silicone compound, or in an amount of 1 to 10% by weight (preferably 1 to 5% by weight) in the case of the alkylphosphoric acid ester compound, relative to the solid content of the coating composition.

The reasons are as follows: If the amount of the release improver used is less than the above range, an improvement in the strippability of the resulting coating film cannot be achieved. If the amount of the release improver used is more than the above range, there occurs a problem such that the strippability of the resulting coating film becomes so high that the coating film peels off from the floor surface during walking.

Preferably, the strippable coating composition for floors according to the present invention further contains a crosslinking agent, because the strength of the resulting coating film can be further enhanced. More preferably, the crosslinking agent is of an internal additive type (one-pack type) in which crosslinking proceeds according to the evaporation of water in the coating film formation process, because this type of crosslinking agent facilitates operation.

Concretely, the crosslinking agent is exemplified by, but not limited to, those of a carbodiimide group-containing type (e.g., "Carbodilite Aqueous Type V-02 (trade name)", "Carbodilite Aqueous Type SV-02 (trade name)", "Carbodilite Aqueous Type V-02-L2 (trade name)", "Carbodilite Aqueous Type V-04 (trade name)", "Carbodilite Aqueous Type V-06 (trade name)", "Carbodilite Aqueous Type E-01 (trade name)", "Carbodilite Aqueous Type E-02 (trade name)", and "Carbodilite Aqueous Type E-03A (trade name)" produced by NISSHINBO INDUSTRIES, INC.), and those of an oxazoline group-containing type (e.g., "Epocross K-2010E (trade name)", "Epocross K-2020E (trade name)", "Epocross K-2030E (trade name)", and "Epocross WS-500 (trade name)" produced by NIPPON SHOKUBAI CO., LTD.). However, they are not limitative.

Moreover, the strippable coating composition for floors according to the present invention can, if desired, further contain other additives such as plasticizers (e.g., phosphate esters, and fatty acid esters), film-forming aids (e.g., alkyl ethers of ethylene glycol or diethylene glycol or propylene glycol or dipropylene glycol), pigments, dyes, anti-foaming agents (e.g., mineral-based, silicone-based, and polyether type surfactant-based ones), wetting agents, dispersing agents, thickening agents (e.g., inorganic ones, and organic ones), preservatives (e.g., benzoisothiazoline-based ones and triazine-based ones), anti-freezing agents (e.g., polyhydric alcohols), drying accelerators (e.g., lower alcohols such as ethanol and isopropyl alcohol), lubrication regulators, ultraviolet absorbers (e.g., benzotriazole-based ones, and benzophenone-based ones), antioxidants (e.g., hindered phenol-based ones, phosphate-based ones, sulfur-based ones), and light stabilizers (HALS).

The film-forming aids are volatile water-soluble solvents necessary for continuously forming the water-dispersed resin into a film when dried.

The above-mentioned strippable coating composition for floors according to the present invention can be applied to the floor surface with the use of a tool used generally and widely, such as a roller, a mop, a brush, or a troweling brush.

The strippable coating composition for floors is applied to the floor surface in such an amount that the thickness of the coating film formed on the floor surface (i.e., dry film thickness) is 20 µm or more (preferably 30 µm or more). This is because if the thickness of the coating film formed on the floor surface (i.e., dry film thickness) is less than 20 µm, the coating film breaks when stripped, regardless of the performance such as the strength of the coating film. Thus, the coating composition can, if desired, be applied by wet-on-wet coating on the floor surface so that the thickness of the coating film formed on the floor surface (i.e., dry film thickness) is 20 µm or more (preferably 30 µm or more).

Examples of the floor to which the strippable coating composition for floors according to the present invention can be applied are those composed of various materials, such as chemical floors (e.g., polyvinyl chloride-based ones, olefin-based ones, and rubber floors), stony floors (e.g., marble, granite, terrazzo, and pottery tile), wooden floors (e.g., flooring, linoleum, and cork), and poured flooring (e.g., epoxy-based ones, and urethane-based ones). However, they are not limitative.

With the strippable coating composition for floors according to the present invention, even if the coating film tears because of trapping by a scar in the floor surface or the joint of the tile when an end of the coating film applied to the floor surface is turned up with a cutter or the like and peeled, the tear caused to the coating film can be inhibited from spreading in the stripping direction. The film can be peeled off, unchanged, as a single continuous film. Thus, a decrease in the stripping work efficiency can be prevented, and sufficient anti-dirt adhesion (black heel mark resistance), water resistance, and dryness can also be obtained.

EXAMPLES

To confirm the effects of the strippable coating composition for floors according to the present invention, the following experiments were conducted:

Examples 1-1 to 1-3

In accordance with the preparation described below using the formulations in Table 1, aqueous polyurethane resins and coating compositions for floors were each prepared. Then, break strength, elongation at break, tear strength, anti-dirt adhesion, strippability, tear spread, water resistance, and dryness were evaluated based on the evaluation methods described below. The results are also shown in Table 1.

<Preparation of Aqueous Polyurethane Resin>

The component (A), the component (B), the component (C), dimethylolpropionic acid (0.45 mol) as a component for imparting a hydrophilic group, isophorone diisocyanate (an amount imparting an NCO index of 1.5) as an isocyanate component, and N-methyl-2-pyrrolidone (an amount making the sold content of a urethane prepolymer 75%) as a solvent were charged, as in the formulation in Table 1, into a reaction flask. The charged substances were reacted for 2.5 to 3 hours at 100° C. to 120° C. in a nitrogen stream. After the reaction system was confirmed to reach a predetermined NCO %, it was neutralized with triethylamine (1.0 mol relative to 1.0 mol of the hydrophilic group) to obtain a urethane prepolymer.

The resulting urethane prepolymer (380 g) was poured, with stirring, into 500 g of water, which incorporated 0.6 g of an anti-foaming agent ("B1016 (trade name)" produced by ADEKA Corporation) and triethylamine (an amount of 0.05 mol relative to 1.0 mol of the hydrophilic group), over 10 minutes at a temperature of 20 to 40° C., thereby dispersing the urethane prepolymer in water. Then, an ethylenediamine/water (weight ratio 1/3) mixture (an amount of 0.6 equivalent relative to the remaining isocyanate of the urethane prepolymer) as a chain extender was added dropwise, and the mixture was stirred for 10 minutes at 20 to 40° C.

Further, an adipic acid dihydrazide/water (weight ratio 1/3) mixture (an amount of 0.3 equivalent relative to the remaining isocyanate of the urethane prepolymer) as a chain extender was added, and stirring was continued for 1 to 2 hours at 20 to 40° C. until the isocyanate groups disappeared, to obtain an aqueous polyurethane resin composition.

<Preparation of Coating Composition for Floors>

The aqueous polyurethane resin (94.0% by weight) of the formulation in Table 1, which was obtained in the above Preparation, 1.0% by weight of a release improver (perfluoroalkylphosphoric ester salt "Surflon S-112 (trade name)" produced by AGC SEIMI CHEMICAL CO., LTD.), 0.02% by weight of a wetting agent (perfluoroalkylcarboxylic acid salt "FTERGENT 150CH (trade name)" produced by NEOS COMPANY LIMITED), 5.0% by weight of polyethylene oxide wax (wax emulsion "Hightec 4000 (trade name)" produced by TOHO CHEMICAL INDUSTRY CO., LTD.), and 0.03% by weight of an anti-foaming agent (silicone-based anti-foaming agent "FS Antifoam 92 (trade name)" produced by Dow Corning Toray Co., Ltd.) were mixed, with the amounts of these components being proportions relative to the total solid content. Water content was adjusted so that the proportion of the total solid content would be 25% by weight, whereby a coating composition for floors was prepared.

Comparative Examples 1-1 to 1-8

Aqueous polyurethane resins and coating compositions for floors were each prepared by the same preparation method as in Example 1-1, except that the formulation of the aqueous polyurethane resin in Example 1-1 was replaced by the formulations described in Table 2. The same evaluation items as in Examples 1-1 to 1-3 were evaluated. The results are also shown in Table 2.

[Evaluation Methods]

<Break Strength and Elongation at Break>

The above-mentioned coating composition for floors was applied onto a plain smooth glass sheet to a predetermined dry film thickness (60 to 70 µm), and dried (25° C.×48 hours). Then, the resulting coating film was detached from the glass sheet, and cut to a predetermined size (40 mm×5 mm). The resulting test piece was subjected to a tension test (break strength and elongation at break) by a tensile tester ("5565 (model)" produced by Instron) (test temperature: 25° C.).

<Tear Strength>

The above-mentioned coating composition for floors was applied onto a plain smooth glass sheet to a predetermined dry film thickness (60 to 70 μm), and dried (25° C.×48 hours). Then, the resulting coating film was detached from the glass sheet, and cut to a predetermined size (10 mm×2 mm). The resulting test piece was subjected to a tear test (measurement of tearing force) by a tensile tester ("5565 (model)" produced by Instron) (test temperature: 25° C.). The measurement of tearing force was made in accordance with JIS K7128-1 "Method for Tear Strength Test of Plastic Films and Sheets—Part 1: Trouser Tear Method".

<Anti-Dirt Adhesion>

The above-mentioned coating composition for floors was applied onto a floor covering material (a homogeneous vinyl floor tile (white color) "MS Plain 5601 (trade name)" produced by TOLI Corp.) to a predetermined dry film thickness (60 to 70 μm), and dried (25° C.×48 hours). This coated floor covering material was laid on a pedestrians' passageway. After a lapse of a predetermined period of time (1 month), the degree of dirt adhesion was visually observed under the following evaluation criteria:

○: Dirt adheres minimally.
Δ: Dirt adheres slightly.
▲: Dirt adheres.
x: Dirt adheres easily.

<Strippability>

The above-mentioned coating composition for floors was applied onto a floor covering material (a homogeneous vinyl floor tile (black color) "MS Plain 5608 (trade name)" produced by TOLI Corp.) to a predetermined dry film thickness (60 to 70 μm), and dried (25° C.×48 hours). The resulting coating film was peeled off the floor covering material, and its strippability was evaluated under the following evaluation criteria:

○: Peels without breakage.
Δ: Slightly tends to break.
▲: Tends to break.
x: Breaks immediately.

<Tear Spreadability>

The above-mentioned coating composition for floors was applied onto a floor covering material (a homogeneous vinyl floor tile (black color) "MS Plain 5608 (trade name)" produced by TOLI Corp.) to a predetermined dry film thickness (60 to 70 μm), and dried (25° C.×48 hours). When the resulting coating film was peeled off the floor covering material, a cut was made in a part of the coating film by a cutter, and the degree of tear spread from this cut portion was evaluated under the following evaluation criteria:

○: Tear spreads minimally.
Δ: Tear spreads slightly.
▲: Tear spreads.
x: Tear spreads easily.

<Water Resistance>

The above-mentioned coating composition for floors was applied onto a floor covering material (a homogeneous vinyl floor tile (black color) "MS Plain 5608 (trade name)" produced by TOLI Corp.) to a predetermined dry film thickness (60 to 70 μm), and dried (25° C.×48 hours). Then, water was dripped onto the coating film and, after the coating film was left to stand for 1 hours, the degree of blushing was evaluated.

○: No blushing.
Δ: Slight blushing.
▲: Blushing.
x: Marked blushing.

<Dryness>

The above-mentioned coating composition for floors was applied onto a floor covering material (a homogeneous vinyl floor tile (black color) "MS Plain 5608 (trade name)" produced by TOLI Corp.) to a predetermined dry film thickness (60 to 70 μm). After the coating film was left to stand for 8 hours at 25° C., dryness to the touch was evaluated to determine whether tack remained or not.

○: Satisfactory dryness (no tack remaining).
Δ: Tack slightly remains.
▲: Tack remains.
x: Tack remains considerably.

TABLE 1

|  |  | Example | | |
|---|---|---|---|---|
|  |  | 1-1 | 1-2 | 1-3 |
| Component (A) | Test compound 1*[1] | 0.34 | — | 0.34 |
|  | Test compound 2*[2] | — | 0.34 | — |
| Component (B) | Test compound 3*[3] | 0.14 | 0.14 | 0.14 |
| Component (C) | Test compound 4*[4] | 0.11 | 0.11 | — |
|  | Test compound 5*[5] | — | — | 0.11 |
| Evaluation item | Anti-dirt adhesion | ○ to Δ | ○ to Δ | ○ to Δ |
|  | Strippability | ○ | ○ | ○ |
|  | Tear spreadability | ○ | ○ | ○ |
|  | Water resistance | ○ | ○ | ○ |
|  | Dryness | ○ | ○ | ○ |
|  | Break strength (MPa) | 45.1 | 52.4 | 43.2 |
|  | Elongation at break (%) | 300 | 270 | 350 |
|  | Tear strength (N) | 1.4 | 1.5 | 1.3 |

Notes:
In Table 1, the values of the components (A) to (C) represent mols.
*[1](Test compound 1): Polyester polyol prepared from 1,6-hexanediol and adipic acid/isophthalic acid, Mw 2000.
*[2](Test compound 2): Polyester polyol prepared from 1,6-hexanediol and adipic acid/isophthalic acid, Mw 15000.
*[3](Test compound 3): 1,4-Cyclohexanedimethanol
*[4](Test compound 4): Ester compound prepared from dehydrated castor oil fatty acid and trimethylolpropane (1:1 mol)
*[5]((Test compound 5): Ester compound prepared from dehydrated castor oil fatty acid and pentaerythritol (1:1 mol)

TABLE 2

|  |  | Comparative Example | | | | | | | |
|---|---|---|---|---|---|---|---|---|---|
|  |  | 1-1 | 1-2 | 1-3 | 1-4 | 1-5 | 1-6 | 1-7 | 1-8 |
| Component (A) | Test compound 1 | 0.48 | 0.45 | 0.59 | 0.34 | — | — | — | — |
|  | Test compound 2 | — | — | — | — | — | — | — | — |
|  | Comparative compound 1 *[6] | — | — | — | — | 0.34 | — | — | — |
|  | Comparative compound 2 *[7] | — | — | — | — | — | 0.34 | — | — |
|  | Comparative compound 3 *[8] | — | — | — | — | — | — | 0.34 | — |
|  | Comparative compound 4 *[9] | — | — | — | — | — | — | — | 0.34 |
| Component (B) | Test compound 3 | — | 0.14 | — | — | 0.14 | 0.14 | 0.14 | 0.14 |
|  | Comparative compound 5 *[10] | — | — | — | 0.14 | — | — | — | — |

TABLE 2-continued

|  |  | Comparative Example | | | | | | | |
|---|---|---|---|---|---|---|---|---|---|
|  |  | 1-1 | 1-2 | 1-3 | 1-4 | 1-5 | 1-6 | 1-7 | 1-8 |
| Component (C) | Test compound 4 | 0.11 | — | — | 0.11 | 0.11 | 0.11 | 0.11 | 0.11 |
| Evaluation item | Anti-dirt adhesion | ○ to Δ | ▲ | ▲ | ○ to Δ | ○ to Δ | ○ to Δ | ○ to Δ | ○ to Δ |
|  | Strippability | ○ | ○ | ○ | ○ | ▲ | ▲ | ▲ | X |
|  | Tear spreadability | ○ | ○ | ○ | ○ | Δ | Δ | Δ | X |
|  | Water resistance | ▲ | ○ | ▲ | ▲ | ○ | ○ | ○ | ○ |
|  | Dryness | ○ | ○ | ○ | ○ | Δ | Δ | Δ | Δ |
|  | Break strength (MPa) | 38.3 | 41.5 | 33.2 | 37.8 | 48.5 | 63.4 | 55.0 | 21.3 |
|  | Elongation at break (%) | 510 | 450 | 650 | 410 | 380 | 330 | 380 | 550 |
|  | Tear strength (N) | 1.6 | 1.4 | 1.8 | 0.9 | 0.7 | 0.7 | 0.6 | 0.2 |

Notes:
In Table 2, the values of the components (A) to (C) represent mols.
*6 (Comparative compound 1): Polyester polyol prepared from 1,6-hexanediol and adipic acid, Mw 2000.
*7 (Comparative compound 2): Polyester polyol prepared from neopentyl glycol and adipic acid, Mw 2000.
*8 (Comparative compound 3): Polycarbonate-based diol, Mw 2000 ("S6002F (trade name)" produced by Asahi Kasei Chemicals Corporation).
*9 (Comparative compound 4): Polytetramethylene ether glycol, Mw 2000 ("PTG-2000SN (trade name)" produced by Hodogaya Chemical Co., Ltd.)
*10 ((Comparative compound 5): Bisphenol A + propylene oxide 2 mols added diol Comparative Examples 1-9 to 1-15

The same evaluation tests as those mentioned above were conducted using the same method of preparing the coating compositions for floors as in Example 1-1, except that the urethane resin in Example 1-1 was replaced by the types described in Table 3 below. The results are also shown in Table 3.

TABLE 3

|  |  | Comparative Example | | | | | | |
|---|---|---|---|---|---|---|---|---|
|  |  | 1-9 | 1-10 | 1-11 | 1-12 | 1-13 | 1-14 | 1-15 |
| Type of urethane resin* |  | a | b | c | d | e | f | g |
| Evaluation item | Anti-dirt adhesion | X | ○ | ○ | ○ | ○ | ○ | ○ |
|  | Strippability | ▲ | X | ○ | ○ | ○ | ○ | ○ |
|  | Tear spreadability | ▲ | ▲ | ▲ | X | X | X | X |
|  | Water resistance | Δ | Δ | Δ | Δ | Δ | Δ | Δ |
|  | Dryness | Δ | Δ | Δ | Δ | Δ | Δ | Δ |
|  | Break strength (MPa) | 9.7 | 26.4 | 24.3 | 27.4 | 41.1 | 26.7 | 35.0 |
|  | Elongation at break (%) | 370 | 10 | 240 | 170 | 220 | 270 | 250 |
|  | Tear strength (N) | 0.4 | 0.3 | 0.2 | 0.2 | 0.2 | 0.2 | 0.2 |

Notes:
*Type of urethane resin
a: "VONDIC 8510 (trade name)" produced by DIC Corporation
b: "HYDRAN HW-171 (trade name) produced by DIC Corporation
c: "ADEKA BONTIGHTER HUX-320 (trade name)" produced by ADEKA Corporation
d: "Superflex 410 (trade name)" produced by Dai-Ichi Kogyo Seiyaku Co., Ltd.
e: "ADEKA BONTIGHTER HUX-232 (trade name)" produced by ADEKA Corporation
f: "HY 870 (trade name)" produced by Air Products Japan Inc.
g: "ADEKA BONTIGHTER HUX-350 (trade name)" produced by ADEKA Corporation Evaluation of Urethane Resin/Acrylic Resin Combined System Example 2-1

The same preparation of and evaluations for a coating composition for floors as in Example 1-1 were performed, except that the urethane resin in Example 1-1 was used in an amount of 74.0% by weight, and 20.0% by weight of an acrylic resin emulsion ("DURA PLUS 3 (trade name)" produced by Rohm & Haas Japan was added. The results are shown in Table 4.

Comparative Example 2-1

The same preparation of and evaluations for a coating composition for floors as in Example 1-1 were performed, except that the urethane resin in Example 1-1 was used in an amount of 69.0% by weight, and 25.0% by weight of the same acrylic resin emulsion as in Example 2-1 was added. The results are shown in Table 4.

Example 2-2

The same preparation of and evaluations for a coating composition for floors as in Example 1-1 were performed, except that the urethane resin in Example 1-1 was used in an amount of 74.0% by weight, and 20.0% by weight of an acrylic-urethane copolymer resin dispersion ("UC90 (trade name)" produced by Alberdingk Boley. Inc.) was added. The results are shown in Table 4.

Example 2-3

The same preparation of and evaluations for a coating composition for floors as in Example 1-1 were performed, except that the urethane resin in Example 1-1 was used in an amount of 54.0% by weight, and 40.0% by weight of the same acrylic-urethane copolymer resin dispersion as above was added. The results are shown in Table 4.

Comparative Example 2-2

The same preparation of and evaluations for a coating composition for floors as in Example 1-1 were performed, except that the urethane resin in Example 1-1 was used in an amount of 34.0% by weight, and 60.0% by weight of the same acrylic-urethane copolymer resin dispersion as above was added. The results are shown in Table 4.

TABLE 4

|  |  | Example | | | Comparative Example | |
| --- | --- | --- | --- | --- | --- | --- |
|  |  | 2-1 | 2-2 | 2-3 | 2-1 | 2-2 |
| Evaluation item | Anti-dirt adhesion | ○ | ○ | ○ | ○ | ○ |
|  | Strippability | ○ | ○ | ○ | X | X |
|  | Tear spreadability | ○ | ○ | ○ to Δ | Δ | X |
|  | Water resistance | ○ | ○ | ○ | ○ | ○ |
|  | Dryness | ○ | ○ | ○ | ○ | ○ |
|  | Break strength (MPa) | 31.3 | 28.6 | 21.8 | N.D. * | 16.3 |
|  | Elongation at break (%) | 170 | 260 | 170 | N.D. * | 110 |
|  | Tear strength (N) | 1.0 | 1.2 | 0.5 | N.D. * | 0.2 |

* N.D.: Not determinable.

As shown in Table 1 (Example 1) and Table 2 (Comparative Example 1), Comparative Examples 1-5 to 1-8 free from the component (A) were inferior in strippability, tear spreadability and dryness, Comparative Examples 1-1, 1-3 and 1-4 free from the component (B) were inferior in water resistance, and Comparative Examples 1-2 and 1-3 free from the component (C) were inferior in anti-dirt adhesion.

As shown in Table 3, Comparative Example 1-10 with an elongation at break of less than 50% was markedly low in strippability, Comparative Example 1-9 with a break strength of less than 10 MPa was low in strippability and markedly lowered in anti-dirt adhesion, and Comparative Examples 1-11 to 1-15 with a tear strength of less than 0.3N produced satisfactory results in terms of anti-dirt adhesion and strippability, but were markedly inferior in tear spreadability.

As shown in Table 4, Examples 2-1 to 2-3 involving the addition of an acrylic resin and an acrylic-urethane copolymer resin were found to be capable of improving anti-dirt adhesion in comparison with Example 1-1 free of the addition of an acrylic resin or an acrylic-urethane copolymer resin.

However, Comparative Example 2-1 adding 25.0% by weight of an acrylic resin provided a very brittle coating film, and the coating film was markedly inferior in strippability and tear spreadability. Comparative Example 2-2 involving the addition of 60% by weight of a urethane-acrylic copolymer emulsion also gave a tear strength of less than 0.3N, and was inferior in strippability and tear spreadability.

Examples 1-1 to 1-3 and Examples 2-1 to 2-3 obtained satisfactory results in all of anti-dirt adhesion, strippability, tear spreadability, water resistance and dryness. Hence, the strippable coating composition for floors according to the present invention was confirmed to be excellent in stripping work efficiency (strippability and tear spreadability), anti-dirt adhesion (black heel mark resistance), water resistance and dryness of the coating film formed.

INDUSTRIAL APPLICABILITY

The strippable coating composition for floors according to the present invention is excellent in stripping work efficiency (strippability and tear spreadability), anti-dirt adhesion (black heel mark resistance), water resistance and dryness of the resulting coating film. Thus, it can be utilized very advantageously in various industries.

The invention claimed is:

1. A strippable coating composition for floors which contains 50% by weight or more of an aqueous polyurethane resin relative to a total solid content and which forms a coating film, the aqueous polyurethane resin being produced by reaction of a hydroxyl-containing compound component and an isocyanate component, wherein
a hydroxyl-containing compound component constituting the aqueous polyurethane resin comprises:
(A) a polyester hydroxyl-containing compound component prepared from 1,6-hexanediol and at least one of an aliphatic dibasic acid and an aromatic dibasic acid,
(B) a low-molecular alicyclic diol component, and
(C) an unsaturated fatty acid ester hydroxyl-containing compound component, and
the coating film has a tear strength of 0.3N or more, a break strength of 10 MPa or more, and an elongation at break of 50% or more,
wherein the hydroxyl-containing compound component contains the component (A) at a molar ratio of 0.3 to 0.8, the component (B) at a molar ratio of 0.05 to 0.45, and the component (C) at a molar ratio of 0.05 to 0.35 (provided that a total molar ratio of the three components is 1).

2. The strippable coating composition for floors according to claim 1, wherein
the component (B) is at least one member selected from the group consisting of 1,4-cyclohexanediol, hydrogenated bisphenol A, tricyclodecanedimethylol, 1,3-cyclohexanedimethanol, and 1,4-cyclohexanedimethanol.

3. The strippable coating composition for floors according to claim 1, wherein
the component (C) is an ester compound of a drying oil fatty acid or a semi-drying oil fatty acid with at least one hydroxyl-containing compound component selected from the group consisting of trimethylolpropane, glycerin, and pentaerythritol.

4. The strippable coating composition for floors according to claim 1, wherein
the fatty acid constituting the component (C) is at least one member selected from the group consisting of fatty acids of linseed oil, fatty acids of dehydrated castor oil, fatty acids of safflower oil, fatty acids of soybean oil, linolenic acid, linoleic acid, and oleic acid.

5. The strippable coating composition for floors according to claim 1, wherein
the component (C) is an ester compound composed of a dehydrated castor oil fatty acid and trimethylolpropane.

6. The strippable coating composition for floors according to claim 1, wherein
the component (C) is a monoester compound formed from an unsaturated fatty acid compound and a hydroxyl-containing compound component at a 1:1 molar ratio.

7. The strippable coating composition for floors according to claim 1, wherein
an acrylic resin is contained.

8. The strippable coating composition for floors according to claim 7, wherein
the acrylic resin is contained in an amount of 1 to 20% by weight relative to the total solid content.

9. The strippable coating composition for floors according to claim 1, wherein
an acrylic-urethane copolymer resin is contained.

10. The strippable coating composition for floors according to claim 9, wherein
the acrylic-urethane copolymer resin is contained in an amount of 1 to 40% by weight relative to the total solid content.

11. The strippable coating composition for floors according to claim 1, wherein
a release improver is contained.

12. A coating film for floors which has been formed from the strippable coating composition for floors according to claim 1.

13. The strippable coating composition for floors according to claim 6, wherein
the unsaturated fatty acid compound is a monocarboxylic acid compound, and
the polyol compound has three or more hydroxyl groups.

* * * * *